United States Patent [19]

Mitsuyama et al.

[11] 4,108,544
[45] Aug. 22, 1978

[54] DRIVING MECHANISM FOR TRAVELLING ORIGINAL CARRIER IN AN ELECTROPHOTOGRAPHIC COPYING MACHINE

[75] Inventors: Akira Mitsuyama, Yamatokoriyama; Hiroaki Uchiyama, Nara; Masanobu Deguchi, Yamatotakada, all of Japan

[73] Assignee: Sharp Kabushiki Kaisha, Osaka, Japan

[21] Appl. No.: 743,941

[22] Filed: Nov. 22, 1976

[30] Foreign Application Priority Data

Nov. 21, 1975 [JP] Japan ............................ 50-143531

[51] Int. Cl.² .......................................... G03G 15/28
[52] U.S. Cl. .......................................... 355/8; 355/50
[58] Field of Search ................... 355/8, 50, 51, 66

[56] References Cited

U.S. PATENT DOCUMENTS

| 3,704,944 | 12/1972 | Komori et al. | 355/51 X |
|---|---|---|---|
| 3,990,792 | 11/1976 | Kono et al. | 355/8 |
| 4,012,138 | 3/1977 | Washio et al. | 355/51 |
| 4,035,075 | 7/1977 | Sprado | 355/66 |

*Primary Examiner*—William M. Shoop
*Attorney, Agent, or Firm*—Birch, Stewart, Kolasch & Birch

[57] ABSTRACT

In an electrophotographic copying machine having a travelling original carrier or a travelling optical exposure system, a feedforward clutch and a reverse clutch are selectively operated by a cam mechanism associated with a control clutch and by latch mechanisms associated with the control clutch and controlled by one solenoid.

5 Claims, 7 Drawing Figures

DRIVING MECHANISM FOR TRAVELLING ORIGINAL CARRIER IN AN ELECTROPHOTOGRAPHIC COPYING MACHINE

BACKGROUND AND SUMMARY OF THE INVENTION

The present invention relates to an electrophotographic copying machine and, more particularly, to a mechanism for driving an original carrier or an optical exposure system in the electrophotographic copying machine.

In the conventional electrophotographic copying machine having a travelling original carrier or a travelling optical exposure system, an electromagnetic clutch or a spring clutch is used to transmit the rotation of a motor to the travelling original carrier or the optical exposure system for driving them to reciprocate. In this case, two clutch mechanisms are required, one for driving the original carrier or the exposure system forward (referred to as a feedforward clutch hereinafter) and the other for driving the original carrier or the exposure system backward (referred to as a reverse clutch hereinafter). The control of these clutches and controls or actuation of a charging system and an exposure lamp are achieved by an electric circuit including relay assemblies.

When the electromagnetic clutch is employed for driving the original carrier or the exposure system, the system is compact in size, but the system becomes expensive. When the spring clutch is employed, a solenoid is required to control the operation of the spring clutch. In the conventional system, solenoids are required for the respective spring clutches, and relay assemblies are required for the respective solenoids. Therefore, a large number of elements are employed in the system. This makes the mechanism complicated and expensive.

Accordingly, an object of the present invention is to provide an improved mechanism for reciprocating an original carrier or an optical exposure system in an electrophotographic copying machine.

Another object of the present invention is to provide a mechanism for driving an original carrier or an optical exposure system in a reciprocating fashion, which includes spring clutches and only one solenoid.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a control clutch is provided in addition to a feedforward clutch and a reverse clutch. These clutch mechanisms are driven to rotate in given directions when the electrophotographic copying machine is enabled. A cam mechanism and latch mechanisms are associated with the control clutch. A combination of the cam mechanism and the latch mechanisms controlled by a solenoid selectively operates the feedforward clutch and the reverse clutch, thereby driving an original carrier or an optical exposure system to reciprocate.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
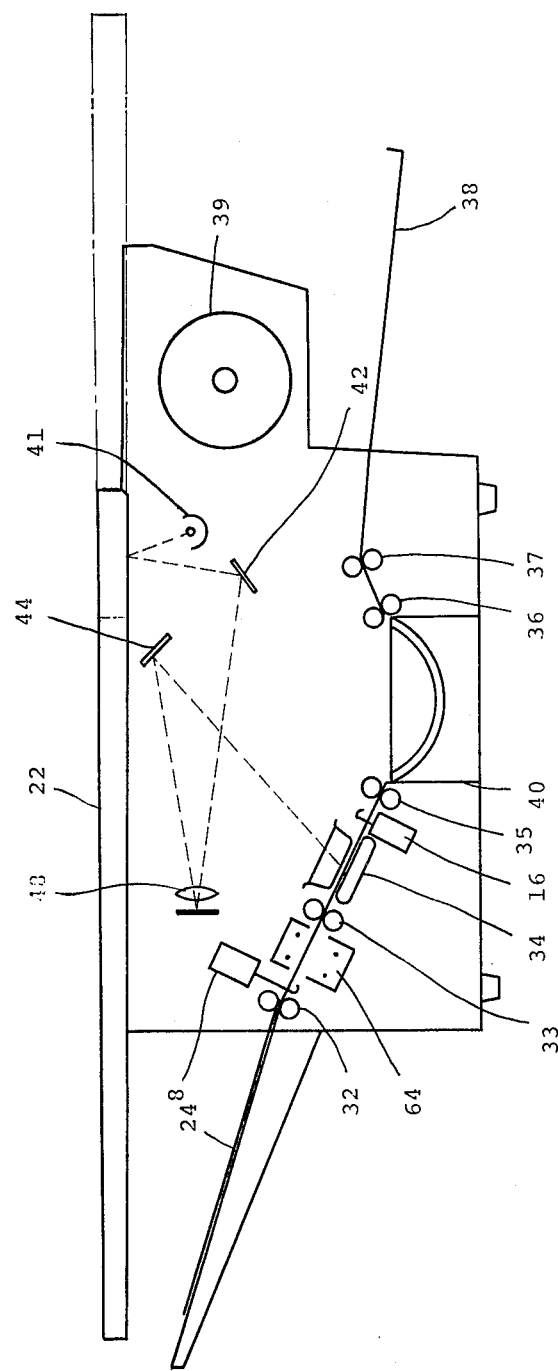
FIG. 1 is a schematic sectional view of an electrophotographic copying machine having a travelling original carrier.

Referring now in detail to the drawings, and to facilitate a more complete understanding of the present invention, a sequence of the duplicating operation in an electrophotographic copying machine having a travelling original carrier will be first described briefly with reference to FIG. 1. In the following description the electrophotographic copying machine having a travelling original carrier is described, however, the present system is applicable to an electrophotographic copying machine having a travelling optical exposure system.

Revolution of a motor 39 is transmitted to rollers 32, 33, 35, 36 and 37 via a chain and sprocket wheels (not shown in FIG. 1). A copy paper 24 is introduced into the electrophotographic copying machine by the rollers 32. The introduction of the copy paper 24 is detected by a microswitch 8, and the surface of the copy paper 24 is uniformly charged by a charging unit 64 during a further transportation of the copy paper 24. Thus uniformly charged copy paper 24 is introduced into an exposure station 34 by the conveying rollers 33, wherein an electrostatic latent image is formed on the copy paper 24 by virtue of an optical exposure system comprising a lamp 41, a first mirror 42, a mirror lens unit 48 and a second mirror 44.

Further, the copy paper 24 actuates another microswitch 16 and enters a developing tank 40 by virtue of the feeding rollers 34, wherein the latent image is developed. Thereafter the copy paper 24 is conveyed onto a tray 38 through the squeezing rollers 36 and the drying rollers 37.

An original carrier 22 is driven to travel toward the right end portion shown by chain lines in FIG. 1 when either one of the microswitches 8 and 16 is actuated by the copy paper 24. When the trailing edge of the copy paper 24 passes the microswitch 16 provided downward of the exposure station 34, the microswitch 16 is turned OFF and the original carrier is driven to travel in the reverse direction its home position.

The present invention relates to a mechanism for driving the original carrier or the optical exposure system.

Figure 2:
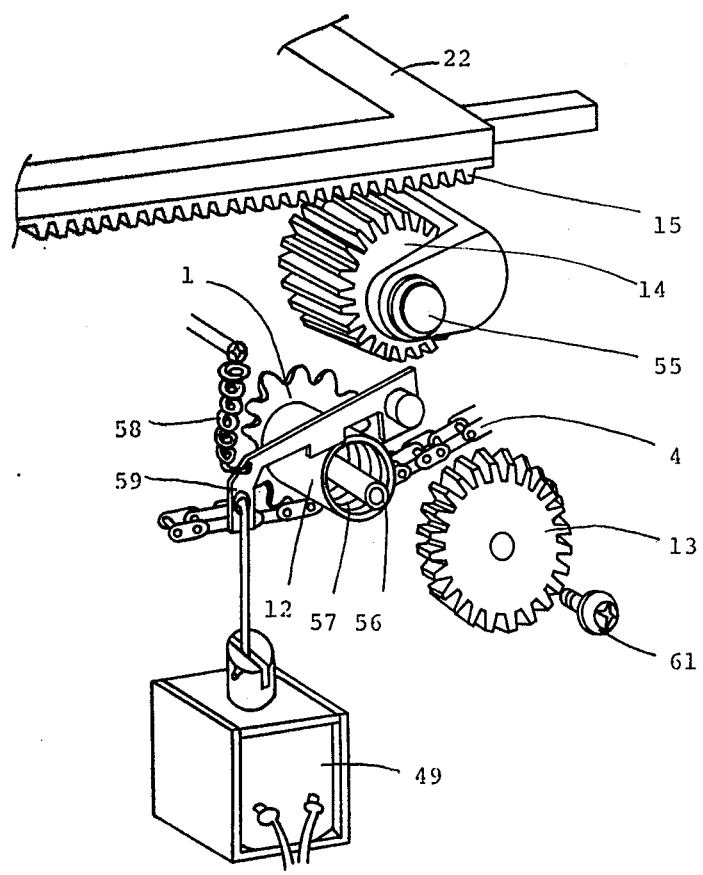
FIG. 2 is a schematic perspective view of an original carrier feeding mechanism of the prior art.
Figure 3:
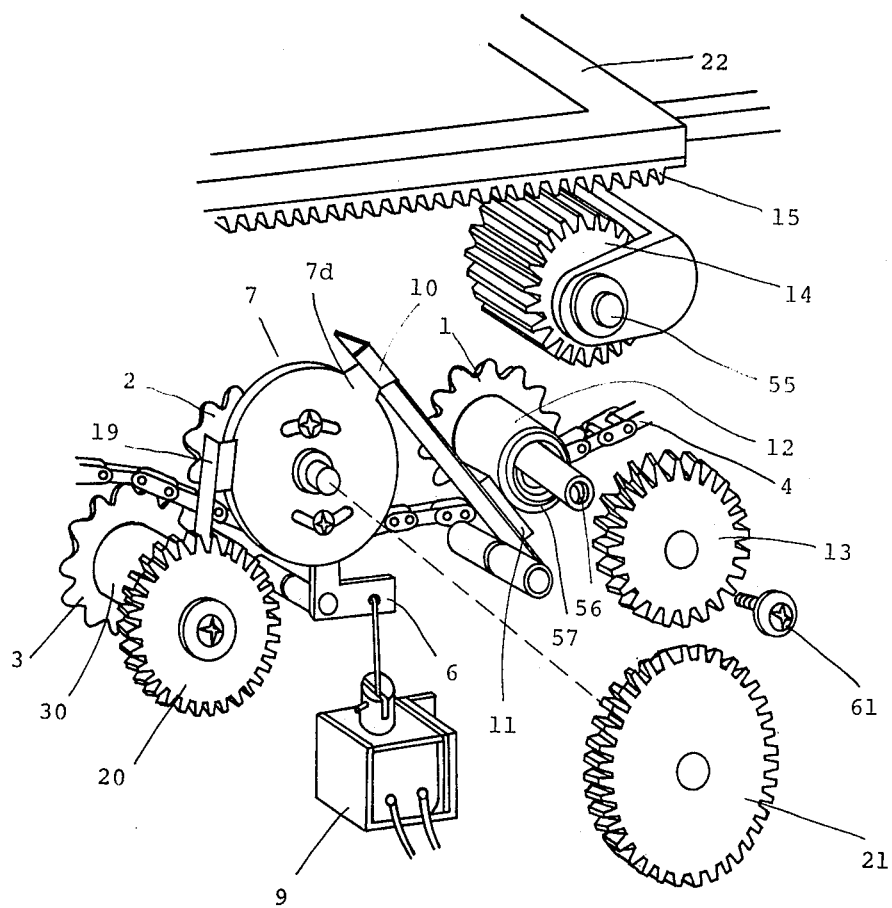
FIG. 3 is a perspective view schematically showing an embodiment of an original carrier driving mechanism of the present invention.

FIG. 2 shows an example of the original carrier driving mechanism of the prior art. In FIG. 2 only a feedforward clutch mechanism is shown and a reverse clutch mechanism is omitted from the drawing for the purpose of simplicity.

The revolution of the motor is transmitted to a sprocket wheel 1 via a chain 4. A feed gear 13, shown in the disengaged condition in FIG. 2, is attached to a boss 56 by a screw 61. The feed gear 13 is associated with a rack gear 14 rotatably secured by a shaft 55 in order to drive the original carrier 22 via a rack 15. Therefore, when the feed gear 13 rotates, the original carrier 22 is driven to travel via the rack gear 14 and the rack 15.

A spring clutch mechanism is provided for trasnitting the revolution of the sprocket wheel 1 to the feed gear 13. The spring clutch mechanism comprises a spring 57 installed within a sleeve 12, both hooked ends of the spring 57 being fixed to the sprocket wheel 1 and the sleeve 12. In the normal condition, the feed gear 13 is maintained in the stopped condition even through the spring 57 and the sleeve 12 rotate in unison with the sprocket wheel 1.

When a feedforward solenoid 49 is actuated, a feedforward clutch lever 59 is pulled downward to depress the sleeve 12, whereby the spring 57 clings to the boss 56 of the feed gear 13. In this way, the revolution of the sprocket wheel 1 is transmitted to the feed gear 13, thereby driving the original carrier 22.

The above-mentioned microswitches 8 and 16 control the energization of the solenoid 49 via a control circuit including relay assemblies. The microswitches 8 and 16 further control the operation of the high-voltage transformer for the charging unit and the lamp 41. The reverse clutch mechanism is provided in addition to the feedforward clutch mechanism for driving the original carrier 22 backward. Therefore, one more solenoid and a control circuit for enabling the additional solenoid is required. This makes the mechanism and control circuit assemblies complicated.

An embodiment of the original carrier driving mechanism of the present invention will be described hereinbelow with reference to FIGS. 3 through 7. Like elements corresponding to those of the foregoing drawings are indicated by like numerals, and the detailed description thereof is omitted from the following description for the purpose of simplicity.

Sprocket wheels 1, 2 and 3 are provided. The sprocket wheel 3 is the same construction as the sprocket wheel 1, and a reverse gear 20 is driven to rotate when a sleeve 30 is depressed. A control gear 21 is rotatably secured at the sprocket wheel 2. The reverse gear 20, the control gear 21, the feed gear 13 and the rack gear 14 are geared with each other.

Figure 4:
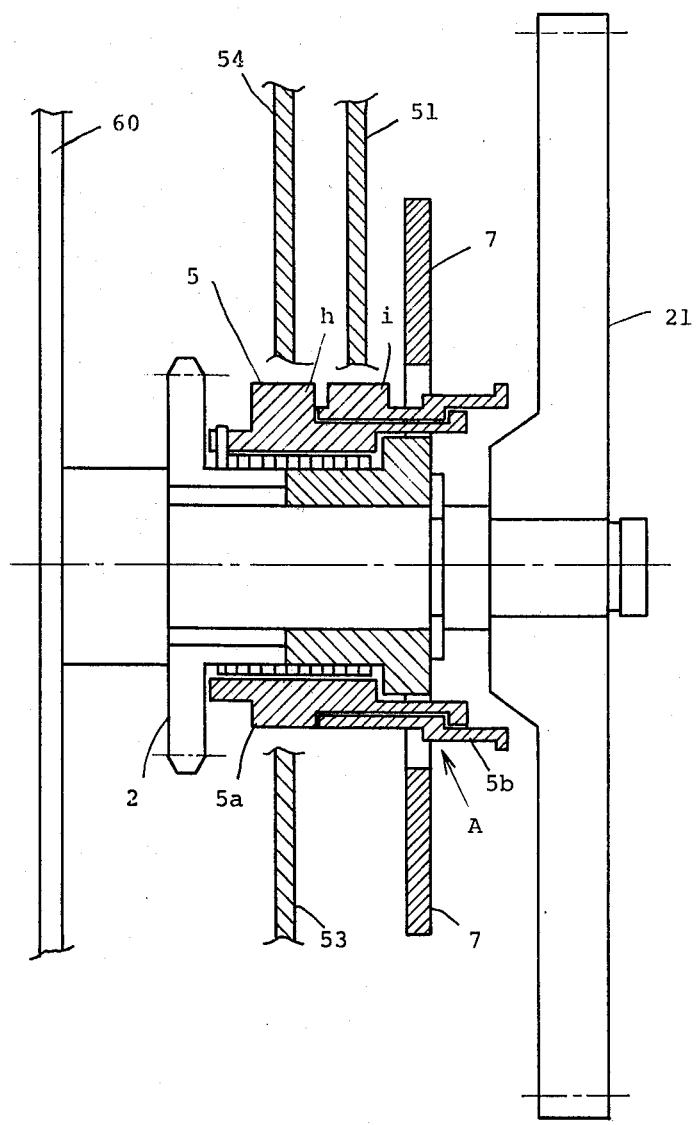
FIG. 4 is a sectional view of an embodiment of a control clutch employed in the original carrier driving mechanism of FIG. 3.

The control gear portion is, as shown in FIG. 4, secured to an electrophotographic copying machine body 60 in such a manner that the sprocket wheel 2 is positioned in close proximity and adjacent to the body 60, and a control clutch A, a cam plate 7 and the control gear 21 are secured adjacent to the sprocket wheel 2 in said order. The control clutch A includes a sleeve 5 secured by a shaft connected to the sprocket wheel 2, thereby controlling the transmission of the revolution of the sprocket wheel 2 to the cam plate 7. In the normal mode, the sleeve 5 and the cam plate 7 are driven to rotate in unison with the sprocket wheel 2.

The sleeve 5 comprises a sleeve 5a having a projection h formed thereon and a sleeve 5b having a projection i formed thereon. The sleeves 5a and 5b are rotatable with respect to each other so as to adjust the distance between the projections h and i at a desired value. The sleeves 5a and 5b are fixed to each other after adjusting the distance between the projections h and i. When either one of the projections h and i of the sleeve 5 is captured by any one of latches 51, 53 and 54, the sleeve 5 ceases to rotate and, hence, the cam plate 7 ceases to rotate since the rotation of the sprocket wheel 2 is not transmitted to the cam plate 7.

Figure 5:
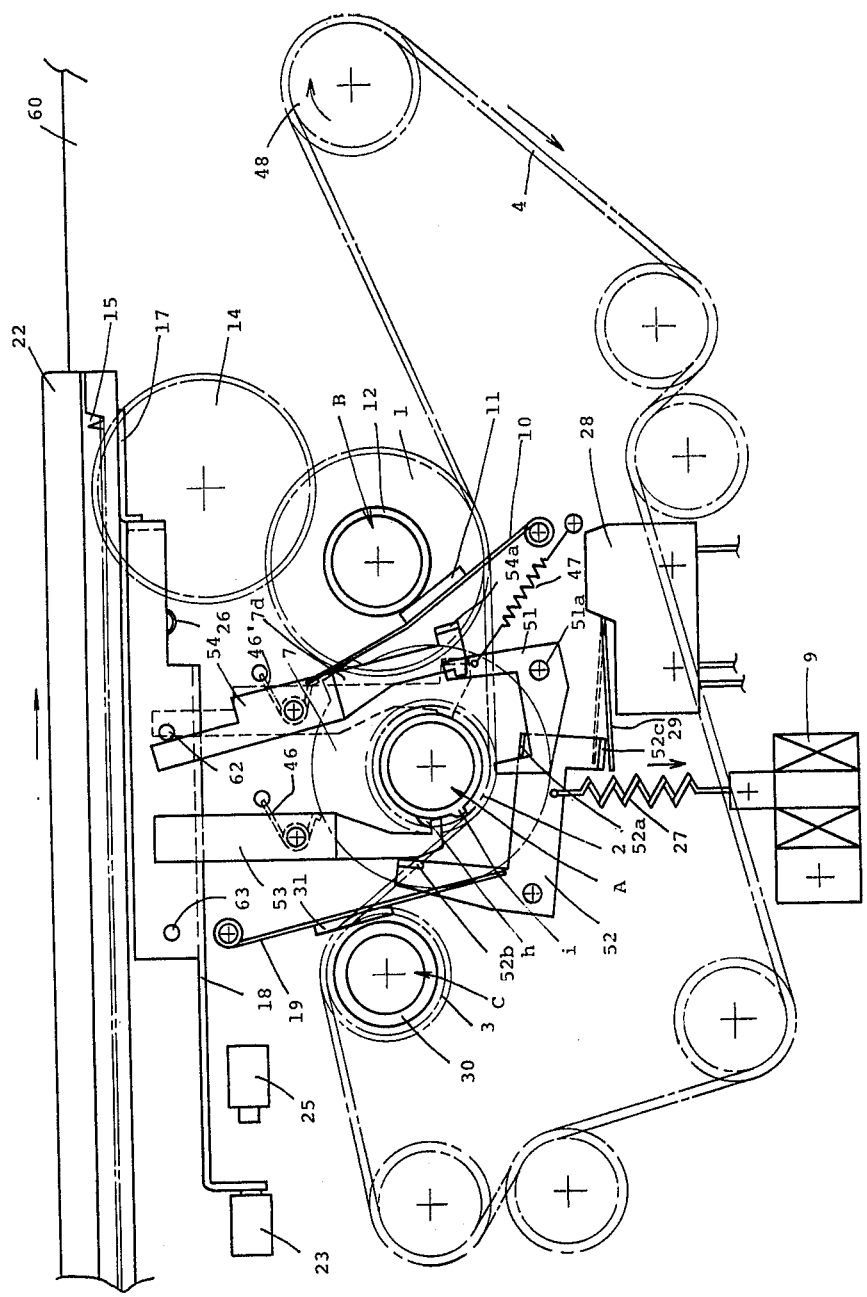
FIG. 5 is a front view showing an operation mode of the original carrier driving mechanism of FIG. 3, wherein the original carrier initiates its forward travel.
Figure 6:
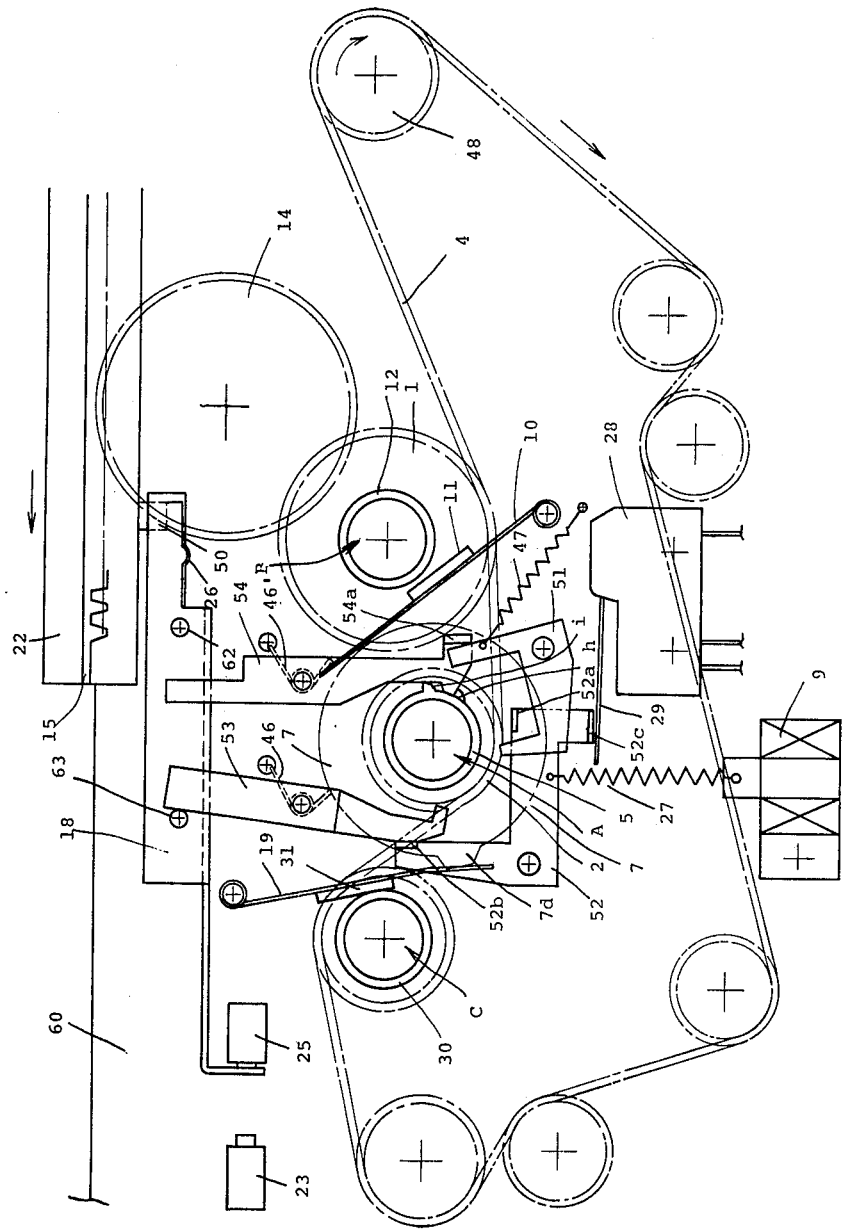
FIG. 6 is a front view showing another operation mode of the original carrier driving mechanism of FIG. 3, wherein the original carrier initiates its backward travel.

A clutch lever 10 is disposed to confront the cam plate 7, thereby controlling the operation of a feedforward spring clutch B, and another clutch lever 19 is disposed so as to confront the cam plate 7 in order to control the operation of a reverse spring clutch C. When a projection 7d formed on the cam plate 7 comes into contact with the clutch lever 10 during the revolution of the cam plate 7 as shown in FIG. 5, a clutch lever shoe 11 of the clutch lever 10 depresses the sleeve 12 of the feedforward spring clutch B, thereby driving the feed gear 13 to rotate. Contrarily, when the projection 7d of the cam plate 7 becomes contact with the clutch lever 19 as shown in FIG. 6, the reverse gear 20 is driven to rotate. As already discussed above, the latches 51, 53 and 54 are disposed around the sleeve 5 of the control clutch A. The clutch levers 10 and 19 are made of leaf springs and, therefore, a depression force above a predetermined value will not be applied to the spring clutch when the clutch levers are depressed by the projection 7d of the cam plate 7, thereby preventing the erroneous rupture of the clutch mechanism.

The latch 51 is rotatably secured by a shaft 51a as shown in FIG. 5 and is forced clockwise by a spring 47 to come into contact with the sleeve 5. A latch 52 is connected to a solenoid 9 via a spring 27 and is driven to rotate clockwise by the solenoid 9. A click 52a of the latch 52 functions to release the latch 51 from the sleeve 5, and another click 52b of the latch 52 functions to depress the latch 53 against the sleeve 5 when the solenoid 9 is actuated. An additional click 52c of the latch 52 functions to depress an actuator 29 of a power switch 28 when the solenoid 9 is actuated.

The latch 53 is forced to separate from the sleeve 5 by a spring 46. The latch 54 is forced toward the sleeve 5 by a spring 46' and functions to release the latch 51 from the sleeve 5 by a click 54a when it is placed in the condition shown in FIG. 6. When the original carrier 22 is positioned at the home position as shown in FIG. 5, the latch 54 is released from the sleeve 5 by a pin 62 provided on a detection lever 18, since a stopper 17 fixed to the original carrier 22 depresses the detection lever 18 left. The above-mentioned latch 51 is positioned to confront the projection i of the sleeve 5, and the latches 53 and 54 are positioned to confront the projection h of the sleeve 5.

The operation of the above constructed mechanism is as follows.

When the original carrier 22 is placed at the home position or the left end in FIG. 5 and the solenoid 9 is not actuated, the latch 53 is released from the sleeve 5 by virtue of the spring 46 and the latch 54 is placed in the condition shown by the solid line in FIG. 5 and, hence, the latch 51 is contacted with the sleeve 5. That is, the projection i of the sleeve 5 catches the latch 51 when the original carrier 22 is positioned at the home position, or, the system is placed in the prepared condition.

Under these conditions, the original to be duplicated is placed on the original carrier 22. The motor 39 begins to rotate when a copy button (not shown) is depressed. The revolution of the motor 39 is transmitted to the sprocket wheels 1, 2 and 3 via a motor sprocket wheel 48 and the chain 4, the direction of the revolution being shown by the arrow in the drawings. At this moment, the rollers 32, 33, 35, 36 and 37 begin to rotate in order to convey the copy paper 24. When the leading edge of the copy paper 24 actuates the microswitch 8, the solenoid 9 is actuated so as to pull down the latch 52 via the spring 27. The latch 53 is depressed toward the sleeve 5, and the latch 51 is released from the sleeve 5. The actuator 29 is depressed and, hence, the power switch 28 operates. When the latch 51 is released from the projection $i$ of the sleeve 5, the sleeve 5 begins to rotate in unison with the sprocket wheel 2 and, hence, the cam plate 7 initiates the revolution.

The copy paper 24 is further conveyed by the convey rollers 33 through the charging unit 64 and reaches the exposure station 34 after being uniformly charged. In synchronization with the paper feed, the cam plate 7 rotates, and terminates its revolution when the projection $h$ of the sleeve 5 catches the latch 53 and the revolution of the sleeve 5 is terminated. At this moment, the projection 7d of the cam plate 7 confronts the clutch lever 10 as shown in FIG. 5 so as to depress the clutch lever shoe 11 of the clutch lever 10 against the sleeve 12 of the feedforward clutch B, whereby the revolution of the sprocket wheel 1 is transmitted to the feed gear 13. The revolution of the feed gear 13 is transmitted to the rack 15 via the rack gear 14 so as to drive the original carrier 22 to travel towards the right.

In the foregoing operation, the original carrier 22 should be driven to travel in synchronization with the appearance of the leading edge of the copy paper 24 at the exposure station 34. This time delay, corresponding to the time period beginning at the time when the leading edge of the copy paper 24 reaches the microswitch 8 and ending at the time when the leading edge of the copy paper 24 reaches the exposure station 34, is achieved by a delay circuit in the conventional electrophotographic copying machine having a travelling original carrier. However, in the system of the present invention, said time delay is mechanically achieved by the sleeve 5.

The above-mentioned time delay interval can be adjusted at a desired value by adjusting the locations of the projections $h$ and $i$ of the sleeve 5. When the preset time delay interval is short and, hence, the original carrier 22 begins to travel before the leading edge of the copy paper 24 reaches the exposure station 34, the sleeve 5 should be adjusted so as to increase the distance between the projections $h$ and $i$. In short, the distance between the projections $h$ and $i$ is selected so that the time interval beginning at the time when the latch 51 is disengaged from the projection $i$ (when the leading edge of the copy paper 24 reaches the microswitch 8) and ending at the time when the projection $h$ catches the latch 53 coincides with the time interval beginning at the time when the leading edge of the copy paper 24 reaches the microswitch 8 and ending at the time when the leading edge of the copy paper 24 reaches the exposure station 34. The above-mentioned time interval adjustment is easily mechanically achieved.

When the leading edge of the copy paper 24 reaches the exposure station 34, the projection $h$ of the sleeve 5 catches the latch 53 and the projection 7d of the cam plate 7 is held stationary at the position where the clutch lever 10 is depressed as shown in FIG. 5. The clutch lever shoe 11 of the clutch lever 10 depresses the sleeve 12 and, therefore, the feed gear 13 is driven to rotate, whereby the original carrier 22 is driven to travel via the rack gear 14 and the rack 15. When the original carrier 22 travels, the stopper 17 is released from the detection lever 18 and, therefore, the latch 54 is placed in the condition shown by dotted lines in FIG. 5 by virtue of the spring 46'.

The microswitch 16 is also closed when the copy paper 24 is further conveyed. The solenoid 9 is actuated when either one of the microswitches 8 and 16 is closed.

The copy paper 24 passes through the charging unit 64 and the exposure station 34 by virtue of the rollers 32, 33 and 35. When the trailing edge of the copy paper 24 passes the microswitch 16, the microswitch 16 is turned OFF and, hence, the solenoid 9 is deactuated. The latch 53 is released from the sleeve 5 by virtue of the spring 46 and, therefore, the sleeve 5 begins to rotate since the projection $h$ of the sleeve 5 is disengaged from the latch 53. The cam plate 7 begins to rotate in unison with the sleeve 5. The projection 7d of the cam plate 7 is separated from the clutch lever 10 to stop the revolution of the feed gear 13 (the original carrier 22 is also stopped).

The sleeve 5 further rotates in unison with the sprocket wheel 2 until the projection $h$ is caught by the latch 54 as shown in FIG. 6. When the revolution of the sleeve 5 is terminated, the cam plate 7 is also stopped to depress the clutch lever 19 by the projection 7d. The clutch lever shoe 31 of the clutch lever 19 depresses the sleeve 30 of the reverse clutch C, whereby the rotation of the sprocket wheel 3 is transmitted to the reverse gear 20. The revolution of the reverse gear 20, in the same direction as the sprocket wheel 3, is transmitted to the rack 15 via the control gear 21, the feed gear 13 and the rack gear 14 in order to drive the original carrier 22 to travel toward the home position. At this moment, the feedforward clutch B is disconnected since the projection 7d of the cam plate 7 does not depress the clutch lever 10. Therefore, the feed gear 13 is free from the revolution of the sprocket wheel 1. When the original carrier 22 is driven to travel backward, the feed gear 13 is driven to rotate in the counter direction to that of the sprocket wheel 1.

When the original carrier 22 returns to the home position, the stopper 17 fixed to the original carrier 22 depresses the detection lever 18 and, therefore, the latch 54 is released from the sleeve 5 by virtue of the pin 62. At this moment, a microswitch 23 is actuated to energize a "ready" lamp for indicating the prepared condition for the succeeding copying operation.

The sleeve 5 and the cam plate 7 rotate in unison with the sprocket wheel 2 since the latch 54 is released from the sleeve 5. The latch 54 is placed in the condition shown by solid lines in FIG. 5, and the latch 51 comes into contact with the sleeve 5 by virtue of the spring 47. Thereafter the projection $i$ of the sleeve 5 catches the latch 51 to complete one cycle of the duplicating operation. The copy paper 24 is further conveyed toward the tray 38 via the developing tank 40, the squeeze rollers 36 and the drying rollers 37.

The lamp 41 for illuminating the original and the high voltage transformer for applying the high voltage to the charging unit 64 must be actuated in synchronization with the travel of the original carrier 22. In the conventional system, a delay circuit or a control circuit including relay means and responsive to the detection of the leading edge of the copy paper 24 is provided. This makes the control circuit complicated.

The above-mentioned synchronization is mechanically achieved in the system of the present invention. For example, the solenoid 9 is actuated when the leading edge of the copy paper 24 is detected by the microswitch 8, whereby the latch 52 is pulled down via the spring 27. This condition is maintained till the trailing edge of the copy paper 24 passes the microswitch 16. The power siwtch 28 is closed via the click 52c of the latch 52 and the actuator 29, whereby the lamp 41 and the charging unit 64 are actuated while the original carrier travels forward.

Figure 7:
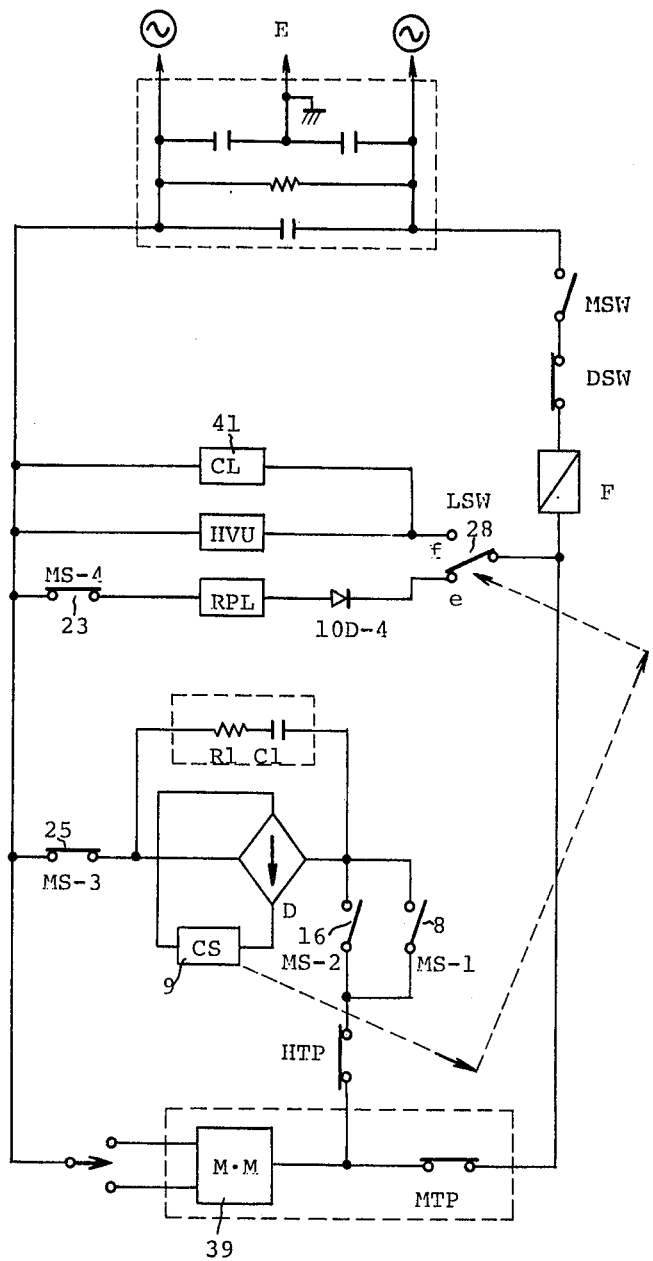
FIG. 7 is a block diagram of a control circuit of an electrophotographic copying machine employing the original carrier driving mechanism of the present invention.

FIG. 7 shows an example of the control circuit of the present system.

An input site surrounded by broken lines in FIG. 7 forms a noise filtering circuit. MSW is a main switch, DSW is a door switch, and F is a fuse. The motor 39 is connected to the power source via the main switch MSW, the door switch DSW and the fuse F. The coil CS of the solenoid 9 and the switch LSW of the power switch 28 is connected to the motor 39 in a parallel fashion. The coil CS is connected to the power source via a rectifier D, and the coil CS is enabled through the contact MS-1 of the microswitch 8 and/or the contact MS-2 of the microswitch 16.

The switch LSW is usually closed to a contact $e$ side, and connected to another side $f$ when the actuator 29 is depressed by the click 52c of the latch 52 by virtue of the solenoid 9. The ready lamp RPL is connected to the $e$ side via a diode 10D-4 for indicating the prepared condition for the succeeding duplicating operation. The lamp CL or the lamp 41 for illuminating the original and the high voltage transformer HVU for applying the high voltage to the charging unit 64 are connected to the side $f$. Character MS-3 represents a contact of a microswitch 25 which is opened by the detection lever 18. Character MS-4 represents a contact of the microswitch 23 which is closed by the detection lever 18. A circuit made of a capacitor $C_1$ and a resistor $R_1$ is a protect circuit for the rectifier D. HTP is a protective switch for a high temperature when the system is over heated, MTP is a protective switch for the motor 39.

The operation of the above constructed circuit is as follows.

First, the original is placed on the original carrier 22 and the main switch MSW is closed. The motor 39 is enabled and the revolution thereof is transmitted to the sprocket wheels 1, 2 and 3 via the chain 4. The copy paper 24 is inserted into the copying machine by the operator when the ready lamp RPL is enabled. The copy paper 24 is conveyed by the roller 32, and the contact MS-1 is closed when the leading edge of the copy paper 24 reaches the microswitch 8. An electric current flows to the coil CS through the contact MS-1, the rectifier D and the contact MS-3.

The solenoid 9 is actuated, and the actuator 29 of the power switch 28 is depressed by the click 52c of the latch 52 to close the side $f$ of the switch LSW. The lamp 41 or CL and the high voltage transformer HVU of the charging unit 64 is actuated. The travelling copy paper 24 is uniformly charged by the charging unit 64, and the original supported by the original carrier 22 is illuminated by the lamp 41. In synchronization with the appearance of the copy paper 24 at the exposure station 34, the original carrier 22 initiates the travel to form the electrostatic latent image on the travelling copy paper 24. The microswitch 16 is also closed by the copy paper 24. When the trailing edge of the copy paper 24 passes the microswitch 16 after formation of the latent image, the contact MS-2 is opened and, hence, the coil CS of the solenoid 9 does not receive the electric current. The selenoid 9 is deactuated, and the latch 52 is returned to its original position by the latch 53. The click 52c ceases to depress the actuator 29 to shift the movable contact of the switch LSW to the $e$ side.

The lamp CL and the high voltage transformer HVU are not actuated. At this moment, the original carrier 22 is stopped since the projection $h$ of the sleeve 5 is released from the latch 53. Thereafter, the original carrier 22 is driven to travel backward since the projection $h$ of the sleeve 5 catches the latch 54. When the original carrier 22 is returned to its home position, the stopper 17 depresses the detection lever 18 to release the latch 54 from the projection $h$ of the sleeve 5 by virtue of the pin 62, whereby the original carrier 22 is stopped at the home position. The detection lever 18 also closes the microswitch 23. The ready lamp RPL is enabled via the contact MS-4 for indicating the prepared condition for the succeeding duplication. The copy paper 24 carrying the developed image formed thereon is conveyed to the tray 38.

The above-mentioned cycle is repeated to obtain a multisheet of copies.

The following is the operation when the copy paper 24 is jammed in the copying machine.

Now assume the condition where the copy paper 24 is conveyed and the original carrier 22 is driven to travel forward, and then the copy paper 24 is jammed in the copying machine due to some problem. In this condition, either one or both of the microswitches 8 and 16 are ON. The motor 39 continues the revolution and, hence, the original carrier 22 continues the forward travel and there is a possibility that the original carrier 22 travels beyond the permitted right end. At this moment, a stopper pin 50 fixed to the original carrier 22 depresses the detection lever 18 to the right as shown in FIG. 6. At the same time the microswitch 25 is operated, which is normally ON.

The contact MS-3 of the microswitch 25 is opened and, therefore, the coil CS does not receive the electric current and, hence, the solenoid 9 is deactuated. The actuator 29 of the power switch 28 is returned to the normal position to shift the movable contact of the switch LSW to the $e$ side. The lamp 41 or CL is deactuated and the high voltage transformer HVU of the charging unit 64 is electrically separated from the power source. Moreover, the latch 53 is released from the sleeve 5, and the sleeve 5 begins to rotate in unison with the sprocket wheel 2, thereby stopping the original carrier 22.

The original carrier 22 is stopped when the original carrier over runs the right end position and the detection lever 18 is shifted right by the stopper pin 50 and, then, the microswitch 25 is operated by the detection lever 18. In FIGS. 5 and 6, 63 represents a pin for forcedly releasing the latch 53 from the sleeve 5. The pin 64 functions to release the latch 53 from the sleeve 5 when the detection lever 18 is shifted to the right by the stopper pin 50. In this way, the original carrier 22 is suddenly stopped when it travels beyond the permitted end.

Thereafter, the projection h of the sleeve 5 catches the latch 54, and the cam plate 7 terminates the rotation. The projection 7d of the cam plate 7 depresses the clutch lever 19 to depress the sleeve 30 of the reverse clutch C via the shoe 31. Therefore, the reverse gear 20 begins to rotate in unison with the sprocket wheel 3, whereby the original carrier 22 is driven to travel backward.

A lock spring 26 is attached to the detection lever 18 to maintain the above mentioned condition of the detection lever 18. (The microswitch 25 is operated and, hence, the contact MS-3 is OFF.) When the original carrier 22 is returned to its home position, the stopper 17 shifts the detection lever 18 to the left after releasing said locked condition. The microswitch 25 is free from the detection lever 18, and the microswitch 23 is depressed. The contacts MS-3 and MS-4 are ON and, therefore, the forward travel of the original carrier 22 is repeated. The original carrier 22 is repeatedly driven to travel till the jammed copy paper 24 is removed from the copying machine.

When the power supply is erroneously terminated during the time when the original carrier 22 travels or the original carrier 22 is not placed at its home position, the original carrier 22 is driven to travel backward, or, toward the home position upon following initiation of the power supply. This is because the respective latches 51 through 54 are placed in the conditions shown in FIG. 6 when the power supply is terminated. When the power supply is again activated, the sleeve 5 rotates in unison with the sprocket wheel 2. Then, the reverse gear 20 is driven to rotate because the projection h of the sleeve 5 catches the latch 54, whereby the original carrier 22 is driven to travel backward. The invention being thus described, it will be obvious that the same may be varied in many ways. Such variations are not to be regarded as a departure from the spirit and scope of the invention, and all such modifications are intended to be included within the scope of the following claims.

What is claimed is:

1. In an electrophotographic copying machine having a reciprocating original carrier or having a reciprocating exposure system, a driving system for reciprocating said original carrier or said exposure system comprising:
   a motor rotating in a certain direction;
   feedforward spring clutch means for transmitting the rotation of the motor to a feed gear in its operative condition;
   reverse spring clutch means for transmitting the rotation of the motor to a reverse gear in its operative condition;
   transmitting means for transmitting the revolution of the feed gear and the reverse gear to said original carrier or said exposure system; and
   control clutch means for selectively operating said feedforward spring clutch means and said reverse spring clutch means, said control clutch means including:
   first means for receiving the rotation of said motor;
   a cam plate rotatable in unison with said first means;
   second means for stopping the cam plate at a first position;
   third means for operating the feedforward spring clutch means when the cam plate is stopped at the first position;
   fourth means for stopping the cam plate at a second position; and
   fifth means for operating the reverse spring clutch means when the cam plate is stopped at the second position.

2. The driving system of claim 1, wherein the spring clutch comprises a sprocket wheel for receiving the rotation of said motor, a sleeve rotating in unison with the sprocket wheel, a spring disposed within the sleeve, and a shaft disposed within said spring, and wherein said feed gear or said reverse gear is fixed to said shaft.

3. The driving system of claim 2, wherein the third means are a clutch lever disposed between the feedforward clutch means and the control clutch means for depressing the sleeve of the feedforward clutch means when the cam plate is stopped at the first position, whereby the feed gear is rotated in unison with the sprocket wheel to drive the original carrier forward.

4. The driving system of claim 2, wherein the fifth means are made of a clutch lever disposed between the reverse clutch means and the control clutch means for depressing the sleeve of the reverse clutch means when the cam plate is stopped at the second position, whereby the reverse gear is rotated in unison with the sprocket wheel to drive the original carrier backward.

5. The driving system of claim 1, wherein the second and fourth means include latch mechanisms, and a sleeve associated with the first means and having a projection formed thereon to catch said latch mechanisms.

* * * * *